Jan. 4, 1927.
T. F. JOHNSON, JR
1,613,325
DISCONNECTING STIRRUP AND HOOK
Filed March 18, 1924   2 Sheets-Sheet 1
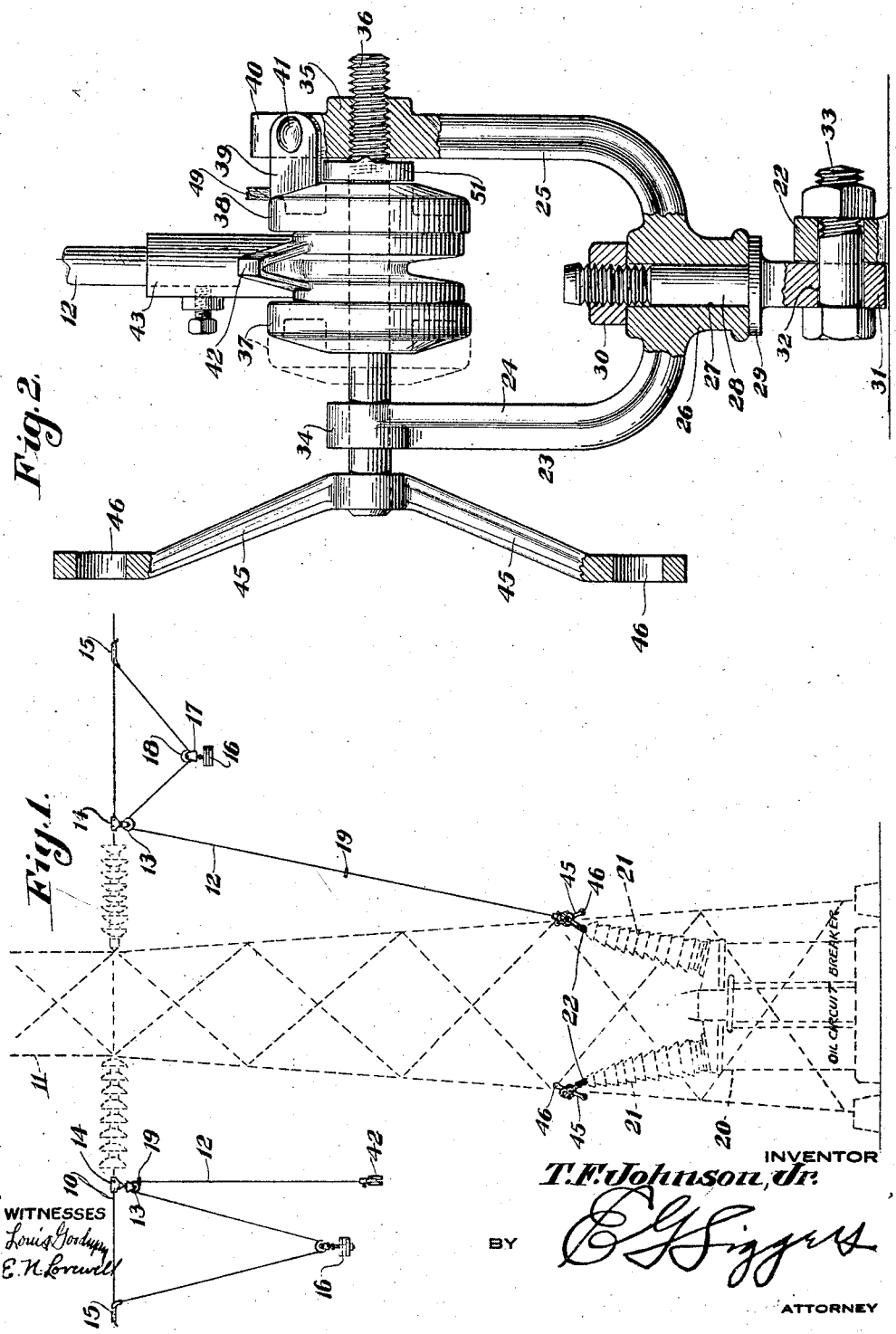
INVENTOR
T. F. Johnson, Jr.
BY
ATTORNEY

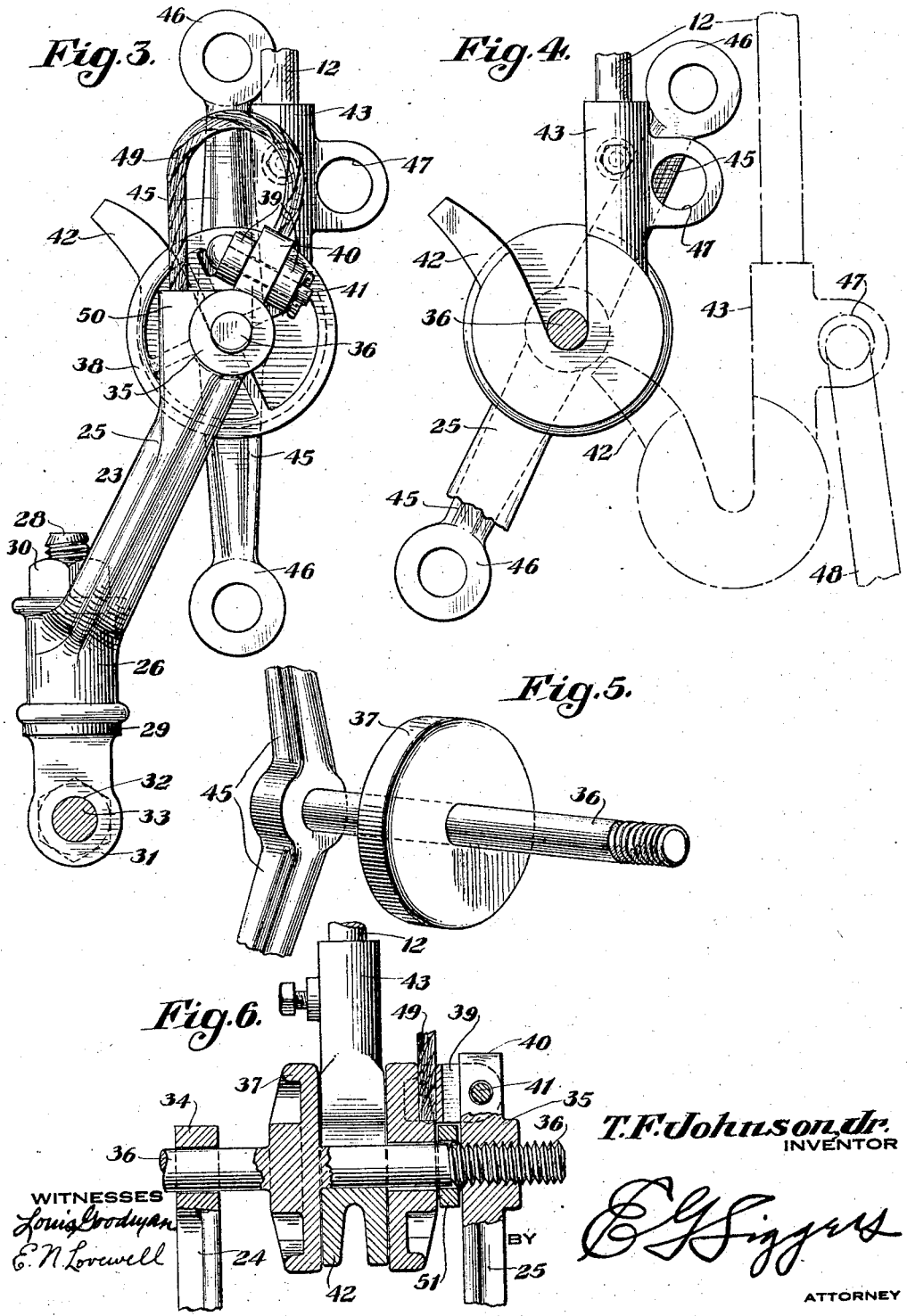

Patented Jan. 4, 1927.

1,613,325

UNITED STATES PATENT OFFICE.

TOMLINSON F. JOHNSON, JR., OF ATLANTA, GEORGIA.

DISCONNECTING STIRRUP AND HOOK.

Application filed March 18, 1924. Serial No. 700,113.

This invention relates to a disconnecting stirrup and hook or skeet switch, particularly designed for use on high tension lines where heavy duty is essential, and especially adapted to be interposed in a branch conductor line leading to an oil circuit breaker, or in any other part of the installation where a similar connection is used.

The general object of the invention is to provide a comparatively inexpensive device adapted to take the place of the usual disconnecting switch or clamp, and one which is especially designed to secure a strong and rugged construction, and which is also easy to install and manipulate.

With the above and other objects in view, which will be clearly apparent from the detailed description which follows, the invention consists in various details of construction and combinations of elements, the construction of which will be described with reference to the accompanying drawings which illustrate one form in which the invention may be embodied, and one installation in which it may be used.

In the drawings:

Figure 1 is a more or less diagrammatic view, showing a high tension system in which the invention is used.

Figure 2 is a view showing the invention partly in front elevation and partly in section.

Figure 3 is a side elevation of the invention.

Figure 4 is a side elevation of the hook with a portion of the stirrup shown in section in connection therewith.

Figure 5 is a perspective detail view of a portion of the clamping device.

Figure 6 is a vertical sectional view through the clamping device and the adjacent portion of the stirrup.

Referring specifically to the drawings, there is shown a bus line 10 supported on a tower 11, and a branch conductor 12 which passes over a sheave 13 supported by a block 14 fast to the line 10, the end of the branch conductor being secured to the line 10 as shown at 15. A weight 16 is supported by a block 17 having a sheave 18 mounted on the line 12, between the block 14 and the point of connection 15. This weight, when the free end of the branch conductor 12 is disconnected, is adapted to raise the same until the stop 19 comes in contact with the block 14. The present invention is particularly adapted to connect the branch conductor 12, as herein shown, to an oil circuit breaker 20, which is provided with a string of insulators 21 supporting a switch bushing at the top of which is a perforated lug 22 to which the invention is adapted to be attached.

The stirrup 23, which constitutes a part of the invention, includes a pair of parallel arms 24 and 25, midway between which is a head 26, extending at an obtuse angle to the plane of the arms, as shown in Figure 3, and having a central bore 27 adapted to receive a connecting bolt 28. The ends of the head 26 are ground, so as to form a perfect contact with a flange 29 formed on the bolt and with the nut 30, respectively.

The lower end, or head, 31 of the bolt, below the flange 29, is flattened, and provided with an eye 32 adapted to be connected to the lug 22 by a suitable bolt 33, or the like. In practice, it will usually be preferable to drill the eye 32 in the field, so that it will be of the proper size to correspond with the hole through the lug 22.

The upper ends of the arms 24 and 25 are provided with eyes 34 and 35, respectively, for receiving a clamping screw 36, one of the eyes, as 35, being internally threaded for this purpose. A pair of clamping disks 37 and 38 are supported on the screw 36, one of the disks, as 37, being fast to the screw, and the other, as 38, being loosely journaled thereon. A pair of ears 39, integral with or rigidly secured to the disk 38, receive between them the projecting upper end 40 of the arm 25 to which they are pivotally connected by a pin or bolt 41. The opening through the disk 38 is large enough to permit a slight play of the disk, which is also permitted by its pivotal connection with the projection 40. When the screw 36 is tightened, therefore, the disk 38 automatically assumes the proper position to clamp the hook 42 between the two disks, and to form a perfect contact therewith. The opposite faces of the hook 42 and the opposed faces of the disks 37 and 38 are ground smooth. The shank 43 of the hook 42 is formed with a socket for connection with the free end of the branch conductor 12.

The head of the screw 36 is provided with a number of actuating arms 45 rigidly connected thereto, and provided at their outer ends with eyes 46, and the shank 43 of the hook is provided with a similar eye 47 for receiving the horn of a manipulating stick 48, as indicated in broken lines in Figure 4. This stick is preferably of the construction shown in U. S. Patent No. 1,451,832, issued to me April 17, 1923.

When the hook is brought into engagement with the screw 36, the weight 16 will draw the same upwardly into close engagement therewith, and when the arms 45 are manipulated to tighten the screw, the hook is clamped between the disks 37 and 38, and the small amount of play permitted in the disk 38 results in a perfect contact being formed, so that a perfect connection is made from the branch conductor 12 through the hook 42, disk 37, arms 24 and 25 and bolt 28 to the lug 22 at the top of the oil switch bushing. The disk 38 is preferably connected by a conductor loop 49 to an enlargement 50 at the upper end of the arm 25, so that a perfect connection is made through this disk also. A spacing collar or washer 51 may be interposed between the arm 25 and disk 38 to prevent possible binding of the latter.

The invention, as herein described, is especially designed for heavy and rugged construction, so that a high capacity may be obtained without injurious results. It is especially designed to form a perfect electrical contact, and may also be very easily manipulated to connect or disconnect. It is designed to take the place of the regulation disconnecting switch at a much lower cost for installation.

While I have shown and described in detail the preferred embodiment of my invention, it is to be understood that this is merely illustrative, and that various modifications may be made therein within the scope of what is claimed without departing from the spirit of the invention. I have also indicated one installation in which the invention may be used, but it is obvious that the same may be used wherever a disconnecting switch is desired.

What is claimed is:

1. In a device of the character described, the combination of a stirrup having a pair of arms with opposed eyes formed therein, a screw passing through said eyes and in threaded connection with one of them, a pair of clamping disks supported on said screw, one of said disks being fast to the screw and the other journaled thereon and positively held against rotation therewith, and means for rotating the screw to bring the disks into or out of clamping engagement with a conductor element interposed therebetween.

2. In a device of the character described, the combination of a stirrup having a pair of arms with opposed eyes formed therein, a screw passing through said eyes and in threaded engagement with one of them, a pair of clamping disks supported on said screw between said arms and having opposed flat faces, one of said disks being fast to the screw and the other journaled thereon and held against rotation therewith, a hook having oppositely disposed flat faces adapted to contact with the opposed flat faces of the disks, and means for rotating the screw to bring the disks into or out of clamping engagement with said hook.

3. An electrical disconnecting device, comprising a screw, a member with which said screw has a threaded engagement, a pair of clamping disks supported on said screw, one of said disks being fast to the screw and the other journaled thereon and held against rotation therewith, and means for rotating the screw to bring the disks into or out of clamping engagement with a conductor element interposed therebetween.

4. An electrical disconnecting device comprising a screw, a member with which said screw has a threaded engagement, a pair of clamping disks supported on said screw, one of said disks being fast to the screw and the other loosely journaled thereon and having a pivotal connection with said member which permits said disk to have a slight oscillatory movement in a direction transverse to the screw but holds it against rotation with the screw, whereby to effect a relative adjustment of the opposed faces of the disks so as to form a complete contact with a conductor element interposed therebetween, and means for rotating said screw to bring the disks into clamping relation with said conductor element.

5. An electrical disconnecting device comprising a screw, a member with which said screw has a threaded engagement, a pair of clamping disks supported on said screw, one of said disks being loosely journaled thereon and having a pivotal connection with said member so that said disk is held against rotatory movement with the screw but has a slight oscillatory movement in a direction transverse to the screw, the other disk being fast to the screw so as to rotate therewith, and means for rotating said screw to bring the disks into or out of clamping engagement with a conductor element interposed therebetween.

6. In a device of the character described, the combination of a stirrup having a pair of arms with opposed eyes formed therein, a screw passing through said eyes and in threaded engagement with one of them, a pair of clamping disks supported on said screw between said arms, one of said disks being fast to the screw and the other loosely journaled thereon and having a pivotal connection with one of the arms of the stirrup, said pivotal connection being so disposed as to permit the loosely mounted disk to have a slight oscillatory movement in a direction transverse to the screw but holding the same against rotatory movement with the screw, and means for rotating said screw to bring the opposed faces of the disks into or out of clamping engagement with a conductor element interposed therebetween.

7. In a device of the character described, the combination of a stirrup having a pair of arms with opposed eyes formed therein, a screw passing through said eyes and in threaded engagement with one of them, a pair of clamping disks supported on said screw and having opposed flat faces, a hook having oppositely disposed flat faces adapted to be clamped between said disks, one of said disks being fast to the screw and the other loosely journaled thereon and having laterally projecting ears pivotally connected to one of the arms of the stirrup, said pivotal connection being so disposed as to prevent said loosely mounted disk from rotating with the screw, but permitting it to have a slight oscillatory movement in a direction transverse to the screw, whereby to effect a relative adjustment of the opposed faces of the disks so as to form a complete contact with the oppositely disposed faces of the hook, and means for rotating said screw to bring the disks into or out of clamping engagement with the hook.

8. In a device of the character described, the combination of a stirrup having a pair of arms with opposed eyes formed therein, a screw passing through said eyes and in threaded engagement with one of them, a pair of clamping disks supported on said screw and having opposed flat faces, one of said disks being fast to the screw and the other loosely journaled thereon, said loosely journaled disk having a pair of laterally projecting ears fast thereto, the adjacent arm of the stirrup being extended beyond the screw and between the ears, a pivot pin connecting the extended end to said ears, whereby to hold said loosely journaled disk against rotatory movement with the screw and to permit it to have a slight oscillatory movement in a direction transverse to the screw, so as to effect a relative adjustment of the opposed faces of the disk and form a complete contact with a conductor element interposed between said disks, and means for rotating said screw to bring said disks into or out of clamping engagement with said conductor element.

In testimony that I claim the foregoing as my own, I have hereto affixed my signature.

TOMLINSON F. JOHNSON, Jr.